(12) United States Patent
Tahara

(10) Patent No.: US 7,918,084 B2
(45) Date of Patent: Apr. 5, 2011

(54) EXHAUST GAS PURIFICATION APPARATUS AND METHOD FOR INTERNAL COMBUSTION ENGINES

(75) Inventor: Jun Tahara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 692 days.

(21) Appl. No.: 12/000,638

(22) Filed: Dec. 14, 2007

(65) Prior Publication Data

US 2008/0148720 A1    Jun. 26, 2008

(30) Foreign Application Priority Data

Dec. 26, 2006 (JP) ................................. 2006-349762

(51) Int. Cl.
*F01N 3/00* (2006.01)
(52) U.S. Cl. ................ 60/285; 60/274; 60/277; 60/278; 60/295; 60/297; 60/301; 60/311
(58) Field of Classification Search ..................... 60/274, 60/276, 278, 285, 295, 297, 301, 311
See application file for complete search history.

(56) References Cited

U.S. PATENT DOCUMENTS

| | | | | |
|---|---|---|---|---|
| 3,928,966 A | * | 12/1975 | Goto et al. ....................... | 60/278 |
| 6,973,914 B2 | * | 12/2005 | Wuest et al. .................. | 123/396 |
| 7,051,689 B2 | * | 5/2006 | Tamura et al. ............. | 123/90.15 |
| 7,481,041 B2 | * | 1/2009 | Nagel et al. ...................... | 60/279 |
| 2005/0217245 A1 | * | 10/2005 | Haseyama et al. .............. | 60/278 |

FOREIGN PATENT DOCUMENTS

| | | |
|---|---|---|
| DE | 10 2004 018 676 A1 | 11/2005 |
| EP | 1 096 126 A2 | 5/2001 |
| JP | 9-158787 | 6/1997 |
| JP | A-2003-3833 | 1/2003 |
| JP | A-2003-247459 | 9/2003 |
| JP | A-2004-150415 | 5/2004 |
| JP | A 2005-48701 | 2/2005 |
| JP | A-2006-132458 | 5/2006 |

\* cited by examiner

*Primary Examiner* — Thomas E Denion
*Assistant Examiner* — Diem Tran
(74) *Attorney, Agent, or Firm* — Oliff & Berridge, PLC

(57) ABSTRACT

An exhaust gas purification apparatus for an internal combustion engine having a movable component that is operated during operation of the internal combustion engine includes: a switching portion that switches the exhaust gas temperature increasing control between a first control in which the temperature of exhaust gas is increased without operating the movable component and a second control in which the temperature of exhaust gas is increased operating the movable component; a detecting portion that detects a temporarily sticking state of the movable component; and a controlling portion that, when a temporarily sticking state of the movable component is detected, extends an execution region for the first control toward an execution region for the second control in the entire operation region of the internal combustion engine, whereby the execution region for the second control is reduced.

12 Claims, 5 Drawing Sheets

EXHAUST GAS PURIFICATION APPARATUS AND METHOD FOR INTERNAL COMBUSTION ENGINES

INCORPORATION BY REFERENCE

The disclosure of Japanese Patent Application No. JP-2006-349762 filed on Dec. 26, 2006 including the specification, drawings and abstract is incorporated herein by reference in its entirety.

BACKGROUND OF THE INVENTION

1. Field of the Invention

The invention relates to an exhaust gas purification apparatus and an exhaust purification method for internal combustion engines.

2. Description of the Related Art

Internal combustion engines include a movable component that is operated during the engine operation and the operation of which causes the temperature of exhaust gas to change, such as an EGR valve, a variable nozzle of a variable-capacity turbocharger, an intake throttle valve, and an exhaust throttle valve (For example, refer to claim 5 and Para. 0021 of Japanese Patent Application Publication No. 2005-48701 (JP-A-2005-48701)).

Some of such internal combustion engines are provided with an exhaust gas purification apparatus that executes an exhaust gas temperature increasing control for increasing the exhaust gas temperature during a recovery process for recovering the exhaust gas purification capacity of an exhaust gas purification device, and it is possible to increase the exhaust gas temperature through the operation of the foregoing movable component during the exhaust gas temperature increasing control. For example, Japanese Patent Application Publication No. 2005-48701 describes increasing the exhaust gas temperature by controlling the opening degree of at least one of an intake throttle valve, an EGR valve, and a variable nozzle of a variable-capacity turbocharger. Further, Japanese Patent Application Publication No. 2005-48701 describes increasing the exhaust gas temperature by retarding the fuel injection time without using the movable component.

With regard to the exhaust gas temperature increasing control, in view of increasing the exhaust gas temperature effectively, it is not the best way to increase the exhaust gas temperature through the operation of the movable component (e.g., by opening the EGR valve) in the entire engine operation region. That is, the exhaust gas temperature can be effectively increased by opening the EGR valve only in a limited engine operation region. In other words, the exhaust gas temperature can not be effectively increased by opening the EGR valve in the other engine operation regions. Therefore, in order to increase the exhaust gas temperature effectively, it is preferable that the exhaust gas temperature be increased by opening the EGR valve in the aforementioned limited region and the exhaust gas temperature be increased without using the EGR valve in the other engine operation regions.

Meanwhile, there is a possibility that the EGR valve be temporarily stuck up at the full-close poison by, for example, being frozen when the internal combustion engine is off in a low temperature. In this case, the EGR valve can not be utilized to increase the exhaust gas temperature in the exhaust gas increasing control, and therefore the recovery process for recovering the exhaust gas purification capacity of the exhaust gas purification device can not be properly performed, and the purification of the exhaust gas of the internal combustion may become insufficient.

Note that this problem occurs not only in the case where the EGR valve is used as the movable component utilized to increase the exhaust gas temperature but also in the case where an intake throttle valve, an exhaust throttle valve, a variable nozzle of a variable-capacity turbocharger, or other movable component is used as the movable component utilized to increase the exhaust gas temperature.

SUMMARY OF THE INVENTION

The invention provides an exhaust gas purification apparatus and an exhaust gas purification method for internal combustion engines, which minimize or eliminate the possibility that the exhaust gas temperature increasing control fails to increase the exhaust gas temperature properly due to the movable component being stuck up temporarily.

An aspect of the invention relates to an exhaust gas purification apparatus for an internal combustion engine having a movable component that is operated during operation of the internal combustion engine, the operation of the movable component causing the temperature of exhaust gas of the internal combustion engine to change, the exhaust gas purification apparatus being adapted to execute an exhaust gas temperature increasing control for increasing the temperature of exhaust gas of the internal combustion engine during a process for recovering the purification capacity of an exhaust gas purification device. The exhaust gas purification apparatus includes: switching portion for switching the exhaust gas temperature increasing control between a first control in which the temperature of exhaust gas is increased without operating the movable component and a second control in which the temperature of exhaust gas is increased operating the movable component; detecting portion for detecting a temporarily sticking state of the movable component; and controlling portion for extending, when a temporarily sticking state of the movable component is detected, an execution region for the first control toward an execution region for the second control in the entire operation region of the internal combustion engine, whereby the execution region for the second control is reduced. Another aspect of the invention relates to an exhaust gas purification method for an internal combustion engine having a movable component that is operated during operation of the internal combustion engine, the operation of the movable component causing the temperature of exhaust gas of the internal combustion engine to change, wherein an exhaust gas temperature increasing control for increasing the temperature of exhaust gas of the internal combustion engine is executed during a process for recovering the purification capacity of an exhaust gas purification device. This exhaust gas purification method includes: switching the exhaust gas temperature increasing control between a first control in which the temperature of exhaust gas is increased without using the movable component and a second control in which the temperature of exhaust gas is increased using the movable component; detecting a temporarily sticking state of the movable component; and extending, when a temporarily sticking state of the movable component is detected, an execution region for the first control toward an execution region for the second control in the entire operation region of the internal combustion engine, whereby the execution region for the second control is reduced.

According to the above-described exhaust gas purification apparatus and method, when the movable component is temporarily stuck up, the execution region for the first control is extended while the execution region for the second control is reduced, which reduces or eliminates the chance of the exhaust gas temperature increasing control executing the second control, that is, which causes the first control to be executed instead of the second control to increase the exhaust gas temperature. As such, the above-described exhaust gas purification apparatus and method minimize the possibility that the exhaust gas temperature increasing control fails to increase the exhaust gas temperature properly due to the second control being executed despite that the movable component is temporarily stuck up.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
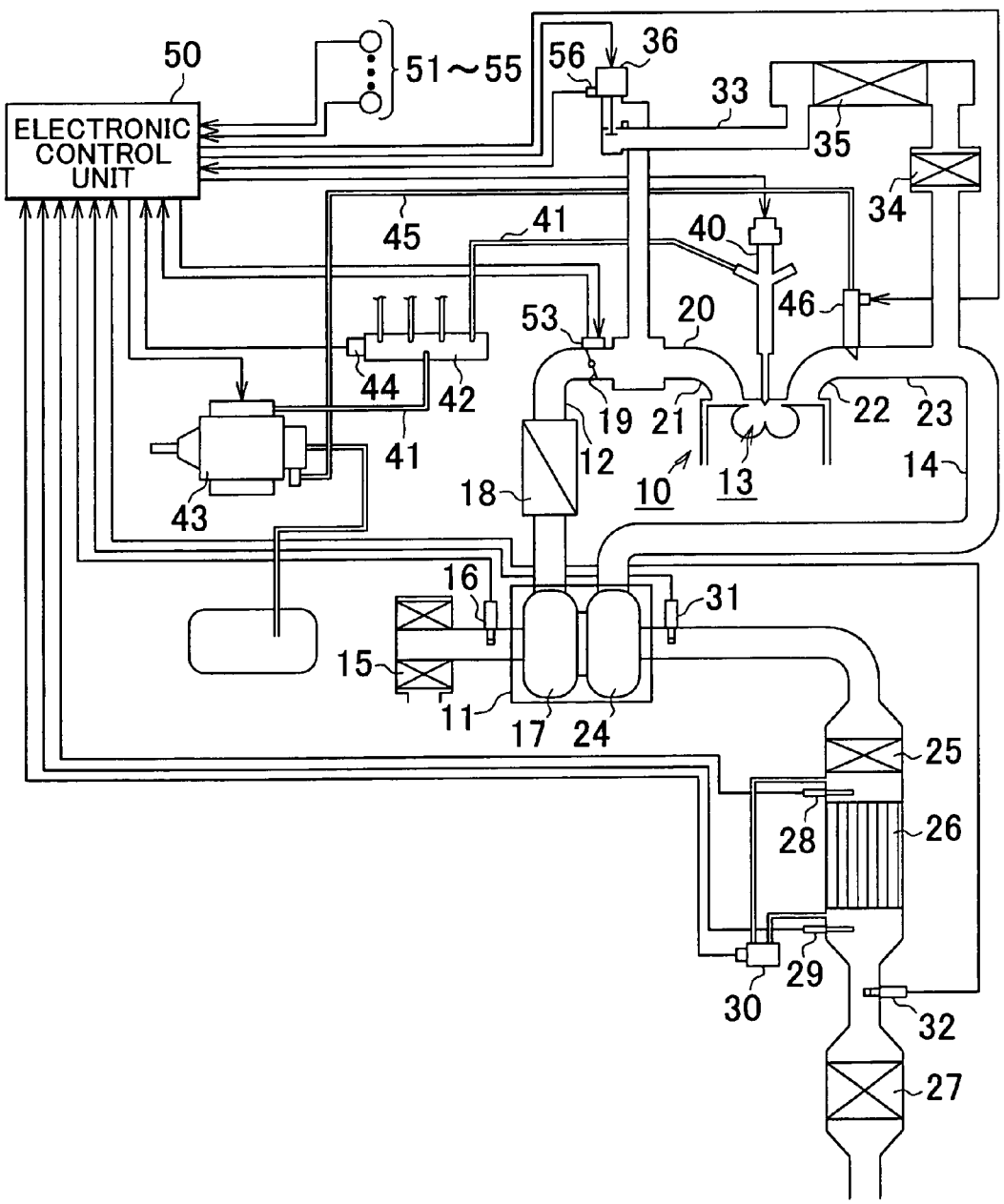
FIG. 1 is a view schematically showing the overall configuration of an internal combustion engine incorporating an exhaust gas purification apparatus according to the invention.

Hereinafter, example embodiments of the invention will be described with reference to FIG. 1 to FIG. 5. In these example embodiments, the invention is applied to an internal combustion engine for motor vehicles. FIG. 1 shows the overall configuration of an internal combustion engine 10 incorporating an exhaust gas purification apparatus according to an example embodiment of the invention. The internal combustion engine 10 is a diesel engine provided with a common-rail type fuel injection system and a turbocharger 11. The internal combustion engine 10 involves, as its major structural sections, an intake passage 12, combustion chambers 13, and an exhaust passage 14.

In the intake passage 12 constituting the intake system of the internal combustion engine 10, an airflow meter 16, a compressor 17 of the turbocharger 11, an intercooler 18, and an intake throttle valve 19 are provided in this order on the downstream side of an air cleaner 15 that is provided at the upstream end of the intake passage 12. The intake passage 12 is branched at an intake manifold 20 provided downstream of the intake throttle valve 19 and connected to the respective combustion chambers 13 of the internal combustion engine 10 via corresponding intake ports 21.

On the other hand, in the exhaust passage 14 constituting the exhaust system of the internal combustion engine 10, exhaust ports 22 connected to the respective combustion chambers 13 are connected to an exhaust turbine 24 of the turbocharger 11 via an exhaust manifold 23. Downstream of the exhaust turbine 24 in the exhaust passage 14, a NOx catalyst converter 25, a PM filter 26, and an oxidizing catalyst converter 27 are provided in this order from the upstream side.

The NOx catalyst converter 25 carries adsorption-reduction type NOx catalyst. The NOx catalyst adsorbs NOx in exhaust gas when the oxygen concentration of exhaust gas is high, and the NOx catalyst releases the adsorbed NOx when the oxygen concentration of exhaust gas is low. Further, if a sufficient amount of unburned fuel components that serve as a reducing agent is present around the NOx catalyst when NOx is released from the NOx catalyst, the NOx catalyst reducts and thus removes the released NOx.

The PM filter 26 is made of a porous material and traps particulate matter (PM) in exhaust gas, which is mainly constituted of soot. Like the NOx catalyst converter 25, the PM filter 26 carries adsorption-reduction type NOx catalyst and removes NOx in exhaust gas. Further, the particulate matter trapped by the PM filter 26 is burned (oxidized) and thus removed through reactions induced by the NOx catalyst.

The oxidizing catalyst converter 27 carries oxidizing catalyst. The oxidizing catalyst removes hydrocarbon (HC) and carbon monoxide (CO) by oxidizing them. A catalyst-entering gas temperature sensor 28 for detecting the temperature of the exhaust gas entering the PM filter 26 is provided on the upstream side of the PM filter 26 in the exhaust passage 14, and a catalyst-discharged gas temperature sensor 29 for detecting the temperature of the exhaust gas discharged from the PM filter 26 is provided on the downstream side of the PM filter 26 in the exhaust passage 14. Further, in the exhaust passage 14, a differential pressure sensor 30 is provided which detects the differential pressure between the exhaust gas on the upstream side of the PM filter 26 and the exhaust gas on the downstream side of the PM filter 26. Further, in the exhaust passage 14, two oxygen sensors 31, 32 for detecting the oxygen concentration in exhaust gas are provided on the upstream side of the NOx catalyst converter 25 and between the PM filter 26 and the oxidizing catalyst converter 27, respectively.

The internal combustion engine 10 is provided with an EGR (Exhaust Gas Recirculation) system that recirculates a portion of exhaust gas back into the intake passage 12. The EGR system has an EGR passage 33 extending between the exhaust passage 14 and the intake passage 12. The upstream end of the EGR passage 33 is connected to a portion of the exhaust passage 14 on the upstream side of the exhaust turbine 24. In the EGR passage 33, an EGR catalyst for reforming the recirculated exhaust gas, an EGR cooler 35 for cooling the recirculated exhaust gas, and an EGR valve 36 for adjusting the flow-rate of the recirculated exhaust gas are provided in this order from the upstream side. The downstream end of the EGR passage 33 is connected to a portion of the intake passage 12 on the downstream side of the intake throttle valve 19.

In the combustion chamber 13 of each cylinder of the internal combustion engine 10 is provided with an injector 40 that injects fuel to be combusted in the combustion chamber 13. The injectors 40 of the respective cylinders are all connected to a common rail 42 via high-pressure fuel supply pipes 41 correspondingly. High-pressure fuel is supplied into the common rail 42 from a fuel pump 43. The pressure of the high-pressure fuel in the common rail 42 is detected by a rail pressure sensor 44 that is attached to the housing of the common rail 42. Further, the fuel pump 43 supplies low-pressure fuel to a fuel supply valve 46 via a low-pressure fuel supply pipe 45.

An electronic control unit 50 executes various controls of the internal combustion engine 10 configured as described above. The electronic control unit 50 is constituted of a CPU (Central Processing Unit) that performs various calculations related to the engine control, a ROM (Read Only Memory) storing various programs and data for the engine control, a RAM (Random Access Memory) for temporarily recording the results of calculations by the CPU, and the like, an input port through which the electronic control unit 50 receives various signals externally, an output port through which the electronic control unit 50 outputs various signals externally, etc.

As well as the foregoing sensors, the following sensors are connected to the input port of the electronic control unit 50: an NE sensor 51 for detecting the engine speed, an accelerator sensor 52 for detecting the operation amount of the accelerator pedal, a throttle valve sensor 53 for detecting the opening degree of the intake throttle valve 19, an intake temperature sensor 54 for detecting the intake temperature of the internal combustion engine 10, a coolant temperature sensor 55 for detecting the temperature of the coolant of the internal combustion engine 10, a lift sensor 56 for detecting whether the EGR valve 36 is open, etc. On the other hand, the intake throttle valve 19, the EGR valve 36, the injectors 40, the fuel pump 43, the fuel supply valve 46, etc. are connected to the output port of the electronic control unit 50.

The electronic control unit 50 outputs command signals to the drive circuits for the respective components connected to the output port of the electronic control unit 50 in accordance with the operation state of the internal combustion engine 10 that is determined from the detection signals transmitted from the respective sensors. As such, the electronic control unit 50 executes various controls, such as the control of the opening degree of the intake throttle valve 19, the EGR control based on the control of the opening degree of the EGR valve 36, the control of the fuel injection amount, fuel injection timing, and fuel injection pressure for the injectors 40, the control of the fuel supply from the fuel supply valve 46.

In this example embodiment incorporating the foregoing configuration, various recovery processes for recovering the exhaust purification capacities of the NOx catalyst converter 25 and the PM filter 26 are executed. As one of the recovery processes, a filter recovery process is executed which, for the purpose of preventing clogging of the NOx catalyst converter 25 and the PM filter 26, burns (oxidizes) and thus removes the particulate mater accumulated in the NOx catalyst converter 25 and the PM filter 26. In order to execute the filter recovery process, the NOx catalyst converter 25 and the PM filter 26 need to be heated up to sufficiently high temperatures. During the filter recovery process, an exhaust gas temperature increasing control for increasing the temperature of the exhaust gas from the internal combustion engine 10 is executed, and unburned fuel components are supplied to the NOx catalyst on the NOx catalyst converter 25 and to the NOx catalyst on the PM filter 26 so that the bed temperatures of the respective NOx catalysts reach target values (e.g., 600 to 700° C.). At this time, the supplying of the unburned fuel components to the NOx catalysts is accomplished by, for example, supplying fuel from the fuel supply valve 46 into exhaust gas.

In this example embodiment, the filter recovery process is started when a given condition or conditions are satisfied, such as when the PM filter 26 is determined to have been clogged based on the fact that the amount of the particulate matter accumulated in the exhaust system, which is estimated from the operation state of the internal combustion engine 10, has reached an allowable limit. When the amount of the accumulated particulate matter has decreased to a given value (e.g., 0) as a result of the filter recovery process, the filter recovery process is determined to be complete, and the filter recovery process is then finished.

Next, the foregoing exhaust gas temperature increasing control executed to recover the filter will be described. The exhaust gas temperature increasing control may increase the temperature of the exhaust gas from the internal combustion engine 10 by utilizing a movable component in the internal combustion engine 10, that the operation of which influences the temperature of the exhaust gas. The movable component is, in this example embodiment, the EGR valve 36. That is, the exhaust gas temperature increasing control increases the exhaust gas temperature by increasing the amount of the EGR gas by opening the EGR valve 36 by a larger degree than the normal state.

The reason why the exhaust gas temperature can be increased by increasing the EGR gas amount lies in the fact that increasing the EGR gas amount reduces the amount of intake air drawn into the intake passage 12 and reduces the amount of the exhaust gas discharged from the exhaust passage 14. That is, when the EGR gas amount is increased, the amount of the gas (exhaust gas) that after absorbing the heat generated by the combustion of fuel in each combustion chamber 13 flows into the portion of the exhaust passage 14 downstream of the inlet of the EGR passage 33 decreases, and therefore the amount of heat absorbed per unit volume of the gas increases. As such, the temperature of the exhaust gas flowing into the portion of the exhaust passage 14 downstream of the inlet of the EGR passage 33 increases accordingly.

Increasing the exhaust gas temperature by opening the EGR valve 36 by a larger degree than the normal state in the exhaust gas temperature increasing control is preferable because it also reduces the amount of NOx emitted from the internal combustion engine 10. However, in view of increasing the exhaust gas temperature, it is not the best way to open the EGR valve 36 by a larger degree than the normal state over the entire operation region of the internal combustion engine 10 in the exhaust gas temperature increasing control. That is, the engine operation region in which the exhaust gas temperature can be effectively increased by opening the EGR valve 36 by a larger degree than the normal state is limited. More specifically, if the EGR valve 36 is opened by a larger degree than the normal state in low engine load regions, such as the region A shown in FIG. 2, the exhaust gas temperature does not increase so much.

That is, in low engine load regions, the amount of fuel combusted in each combustion chamber 13 is relatively small, and therefore the amount of heat applied to the gas passing through each combustion chamber 13 is also small and also the exhaust gas flow-rate in the internal combustion engine 10 is low. If the EGR valve 36 is opened or further opened in this state, the exhaust gas recirculated via the EGR passage 33 is cooled through its recirculation process and the cooled recirculation gas then cools the gas passing through each combustion chamber 13. This makes it more difficult to increase the temperature of the exhaust gas flowing into the portion of the exhaust passage 14 downstream of the inlet of the EGR passage 33. This phenomenon, in particular, is worsened in the case where an EGR cooler 35 is provided in the EGR passage 33 and the exhaust gas flowing in the EGR passage 33 is effectively cooled by the EGR cooler 35.

In consideration of the issue described above, in this example embodiment, in the exhaust gas temperature increasing control, the exhaust gas temperature is increased without opening the EGR valve 36 by a larger degree than the normal state in a low engine load region, and the exhaust gas temperature is increased by opening the EGR valve 36 by a larger degree than the normal state in an engine load region on the high engine load side of the low engine load region as follows. The exhaust gas temperature increasing control is switched between a first control, that is executed in the region A in FIG. 2, which increases the exhaust gas temperature without using the EGR valve 36, and a second control, that is executed in the region B on the high engine-load side of the region A, which increases the exhaust gas temperature by opening the EGR valve 36 by a larger degree than the normal state. Thus, the of the exhaust gas temperature increasing control is switched between the first control and the second control, the temperature of the exhaust gas of the internal combustion engine 10 can be effectively increased.

The exhaust gas temperature increasing control increases the exhaust gas temperature by opening the intake throttle valve 19 by a smaller degree than the normal state and executing an after-injection of each injector 40, which is executed after the main injection to the combustion chamber 13, as well as by opening the EGR valve 36 by a larger degree than the normal state as described above. Specifically, in the first control, the exhaust gas temperature is increased by opening the intake throttle valve 19 by a smaller degree than the normal state and executing the after-injection from each injector 40 while maintaining the EGR valve 36 fully closed (maintaining the EGR valve 36 shut off) to interrupt the exhaust gas recirculation. On the other hand, in the second control, the exhaust gas temperature is increased by opening the EGR valve 36 by a larger degree than the normal state, as well as by opening the intake throttle valve 19 by a smaller degree than the normal state and executing the after-injection from each injector 40 as in the first control described above.

The reason why the exhaust gas temperature can be increased by opening the intake throttle valve 19 by a smaller degree than the normal state and executing the after-injection of each injector 40 is as follows. First, when the intake throttle valve 19 is opened by a smaller degree than the normal state, the resistance against the intake air drawn into the internal combustion engine 10 increases accordingly. In order to obtain a required engine output under this state, the amount of fuel injected from each injector 40 into the combustion chamber 13 during the main fuel injection is increased. As a result, the amount of fuel combusted in each combustion chamber 13 increases, which leads to an increase in the exhaust gas temperature. Next, when the after-injection of each injector 40 is executed, the combustion of fuel in each combustion chamber 13 is delayed by an amount corresponding to the after-injection. This delay causes the gas in the combustion chamber 13 to be discharged into the exhaust passage 14 when the temperature of the same gas is still high, and this causes an increase in the exhaust gas temperature.

Meanwhile, there is a possibility that the EGR valve 36 be temporarily stuck up at the shut-off position (full-close poison) by, for example, being frozen when the internal combustion engine 10 is off at a low temperature. In this case, even if the region of the exhaust gas temperature increasing control needs to be set to the second control in response to the engine operation entering the region B in FIG. 2, the EGR valve 36 can not be opened by a larger degree than the normal state to increase the exhaust gas temperature. In such a case where the EGR valve 36 can not be opened by a larger degree than the normal state, even if the intake throttle valve 19 is opened by a smaller degree than the normal state and the after-injection of each injector 40 is performed, the exhaust gas temperature can not be increased up to the level necessary to burn the particulate matter accumulated in the exhaust system of the internal combustion engine 10, and therefore the filter recovery process can not be executed properly. Thus, the particulate matter trapping capacity of the PM filter 26 can not be recovered, and this results in insufficient removal of particulate matter from exhaust gas and even some failures or malfunctions may occur due to excessive accumulation of particulate matter in the PM filter 26.

To counter this, in this example embodiment, when the EGR valve 36 is temporarily stuck up at the full-close position, the engine operation region in which to execute the first control (will be referred to as "the execution region for the first control") is extended toward the engine operation region in which to execute the second control (will be referred to as "the execution region for the second control"), whereby the execution region for the second control is reduced.

More specifically, when the EGR valve 36 is temporarily stuck up at the full-close position, the execution region for the second control is changed to an execution region for the first control. Thus, when the EGR valve 36 is temporarily stuck up, the first control is executed in the region B shown in FIG. 2, as well as in the region A shown in FIG. 2. That is, the execution region for the first control is extended into the region C (region A+region B) shown in FIG. 3, whereby the execution region for the second control is eliminated.

In the region C, only the control to make the opening degree of the intake throttle valve 19 smaller than the normal state and the after-injections of the injectors 40 are performed such that the exhaust gas temperature increases as required to accomplish the filter recovery process. Thus, in the portion of the region C in FIG. 3 that corresponds to the region B in FIG. 2, the control to make the opening degree of the intake throttle valve 19 smaller than the normal state and the after-injections from the respective injectors 40 are performed such that the exhaust gas temperature is increased more than it is during the second control. Specifically, at this time, as compared to during the second control, the opening degree of the intake throttle valve 19 is reduced, and the amount of fuel injected from each injector 40 during the after-injection is increased while the fuel injection time is delayed.

According to the example embodiment, as such, when the EGR valve 36 is temporarily stuck up at the full-close position, the first control is executed instead of the second control in the region B in which the second control is normally executed, so that the exhaust gas temperature increases as required to accomplish the filter recovery process. This example embodiment, thus, minimizes the possibility of the problem that the second control is executed despite that the EGR valve 36 is stuck up at the full-close position, resulting in the exhaust gas temperature increasing control failing to increase the exhaust gas temperature as required to accomplish the filter recovery process.

Meanwhile, when the EGR valve 36 is temporarily stuck up at the full-close position, it influences some other recovery processes for recovering the exhaust gas purification capacities of the NOx catalyst converter 25 and the PM filter 26, such as the NOx reduction process and the sulfur-poisoning recovery process for the NOx catalyst on the NOx catalyst converter 25 and the NOx catalyst on the PM filter 26, as well as the foregoing filter recovery process. Therefore, when the EGR valve 36 is temporarily stuck up at the full-close position, for example, the of the NOx reduction process for the NOx catalysts is switched and execution of the sulfur-poisoning recovery process for the NOx catalysts is prohibited in accordance with the state of the EGR valve 36.

Figure 4:
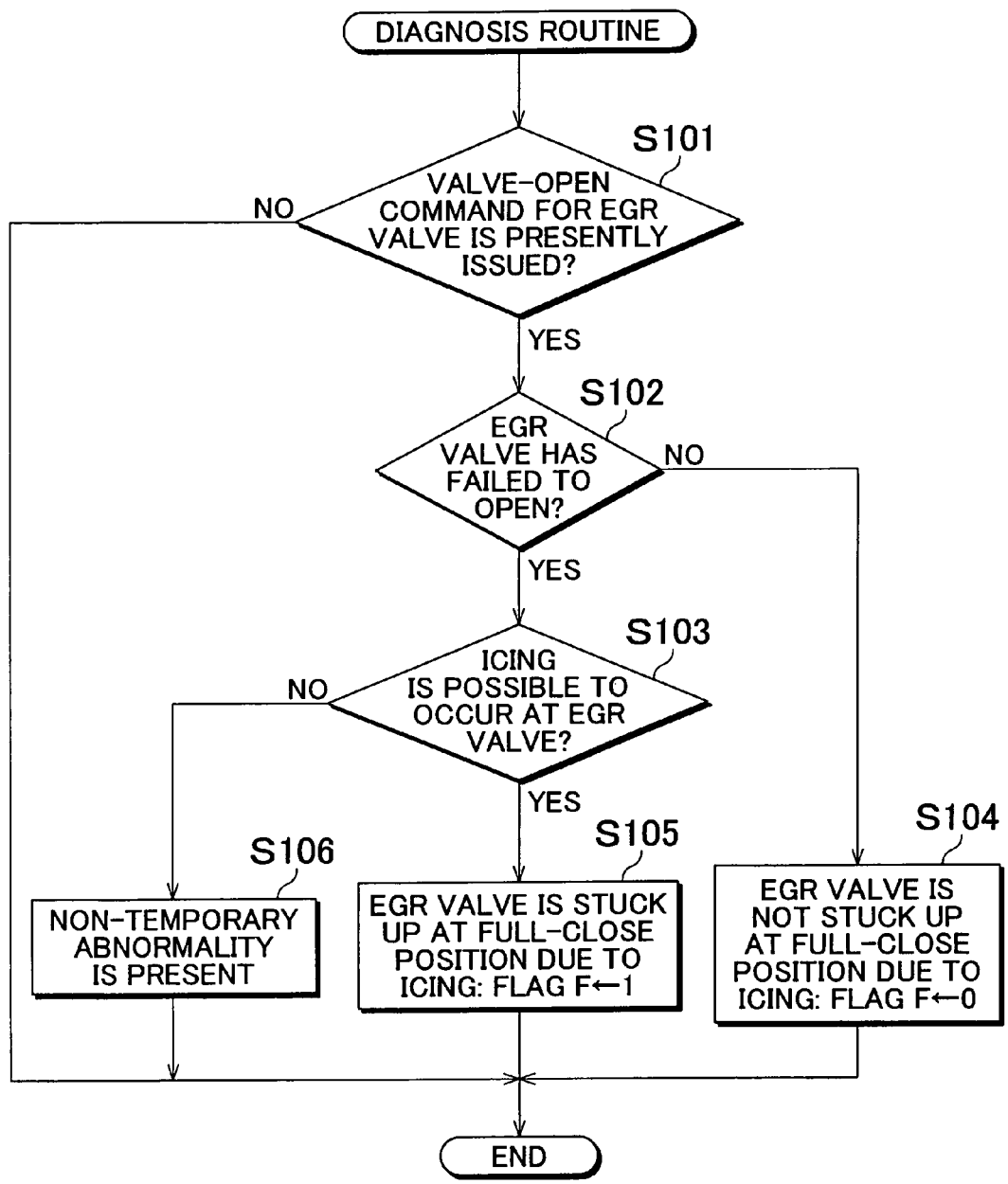
FIG. 4 is a flowchart illustrating the procedure for detecting a temporary sticking of the EGR valve.

Next, a description will be made, with reference to the flowchart of FIG. 4, of a diagnosis routine for detecting whether the EGR valve 36 is temporarily stuck up at the full-close position. This diagnosis routine is periodically executed by the electronic control unit 50, for example, at given time intervals as an interrupt.

In this routine, the electronic control unit 50 determines: whether a valve-open command, which is the command for opening the EGR valve 36 that is presently shut off (fully closed), is presently issued (step 101); whether the EGR valve 36 has failed to be opened (step 102); and whether icing is possible to occur at the EGR valve 36 in the present state (step 103). The determination in step 102 is made based on the detection signals of the lift sensor 56, and the determination in step 103 is made based on the detection signals of the coolant temperature sensor 55, the intake temperature sensor 54, and other sensors (vehicle speed sensor, humidity sensor, etc.). For example, icing may occur at the EGR valve 36 when the coolant temperature and the intake temperature are both low and when the EGR valve 36 is exposed to a low-temperature head wind while the intake temperature is low and the vehicle speed is high.

If "YES" is obtained in step 101 and "NO" is obtained in step 102, it indicates that the EGR valve 36 is presently open as required by the valve-open command. In this case, it is determined that the EGR valve 36 has no abnormality, and a flag F indicating whether the EGR valve 36 is now stuck up at the full-close position due to icing is set to "0" indicating that the EGR valve 36 is not stuck up at the full-close position due to icing (step 104). If "YES" is obtained in step 102, it indicates that the EGR valve 36 is not open despite the valve-open command for the EGR valve 36. In this case, if "YES" is obtained in step 103, it is determined that the EGR valve 36 is temporarily stuck up (e.g., frozen) at the full-close position, and the flag F is set to "1" indicating that the EGR valve 36 is now stuck up (e.g., frozen) at the full-close position (step 105). On the other hand, if "NO" is obtained in step 103, it is highly likely that a certain abnormality, such as a non-temporary sticking of the EGR valve 36, not a temporary sticking of the EGR valve 36 like freezing, is occurring. In this case, therefore, it is determined that a non-temporary abnormity is present (step 106).

In this diagnosis routine, the act of setting the flag F to "1" (the EGR valve 36 being stuck up at the full-close position due to icing) is equivalent to the act of detecting a temporarily sticking state of the EGR valve 36, such as the EGR valve 36 being frozen at the full-close position. Further, if the EGR valve 36 is released from the temporarily sticking state (e.g., temporarily frozen state) due to the heat generated by the internal combustion engine 10 after the flag F has been set to "1" (the EGR valve 36 being stuck up at the full-close position due to icing), the normal operation of the EGR valve 36 resumes, and therefore "YES" is obtained in step 102. As a result, the flag F is set to "0" (the EGR valve 36 not being stuck up at the full-close position due to icing) in step 104.

Figure 5:
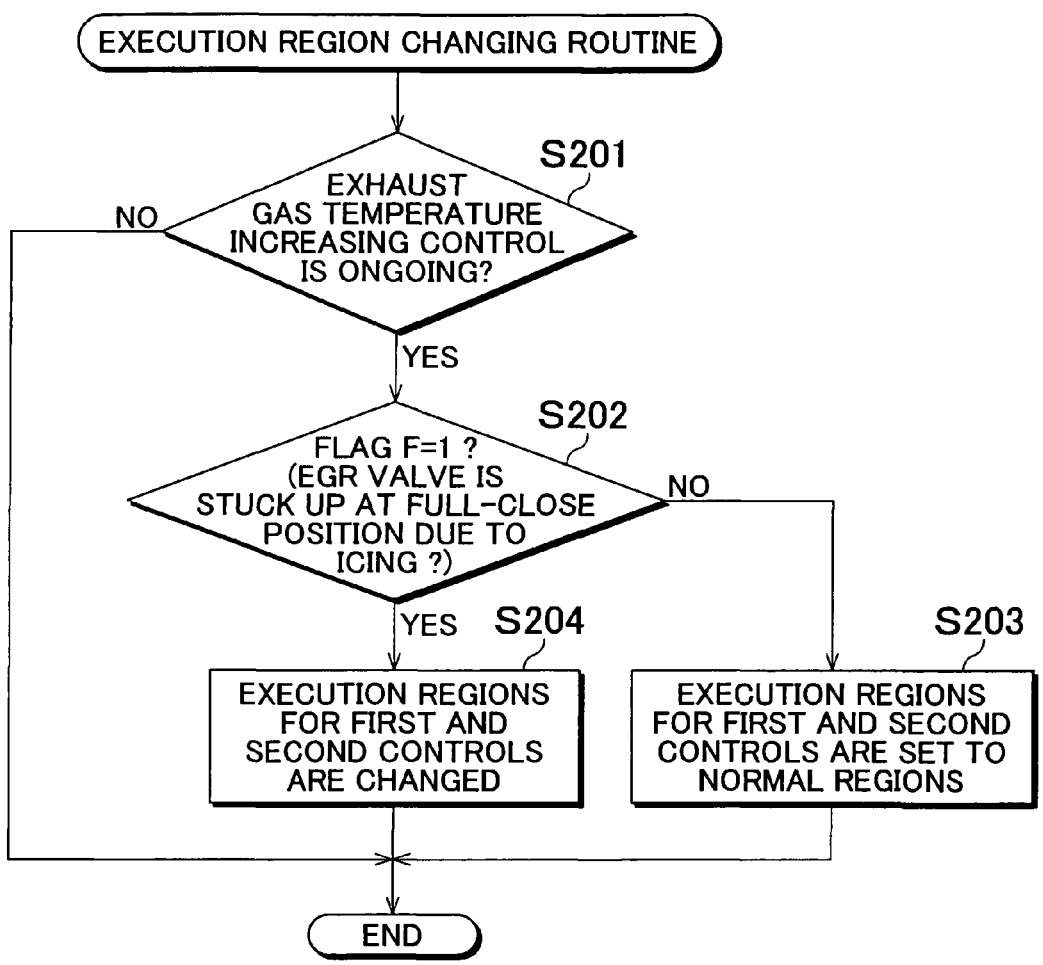
FIG. 5 is a flowchart illustrating the procedure for changing the execution regions for the first control and the second control.

Next, a description will be made, with reference to the flowchart of FIG. 5, of an execution region changing routine for changing the execution regions for the first control and the second control in the exhaust gas temperature increasing control. This execution region changing routine is periodically executed by the electronic control unit 50, for example, at given time intervals as an interrupt.

In this routine, if the exhaust gas temperature increasing control is ongoing (step 201: YES), the electronic control unit 50 determines whether the flag F is presently set to "1" (the EGR valve 36 being stuck up at the full-close position due to icing), in other words, whether a temporary sticking of the EGR valve 36 at the full-close position is presently detected (step 202).

If "NO" is obtained in step 202, the execution regions for the first control and the second control are set to the normal execution regions (step 203). More specifically, the execution region for the first control is set to the region A shown in FIG. 2 and the execution region for the second control is set to the region B shown in FIG. 2. On the other hand, if "YES" is obtained in step 202, the execution regions for the first control and the second control are changed such that the execution region for the first control is extended while the execution region for the second control is reduced (step 204). More specifically, at this time, the execution region for the first control is extended into the region C shown in FIG. 3 which covers the regions A and B shown in FIG. 2, whereby the execution region for the second control is eliminated.

After the execution regions for the first control and the second control have been changed as described above, if the EGR valve 36 is released from the temporarily stuck (frozen) state due to the heat generated by the internal combustion engine 10, or the like, the flag F is then set to "0" (the EGR valve 36 not being stuck up at the full-close position due to icing). As such, the execution regions for the first control and the second control that have been changed as described above are changed back to the normal execution regions (refer to FIG. 2) in step 203.

While the execution regions for the first control and the second control are changed (step 204), the parameters related to the control of the internal combustion engine 10 in the exhaust gas temperature increasing control are adjusted to values suitable for the temporarily sticking state of the EGR valve 36. These parameters include, for example, the fuel injection amounts and the fuel injection timings of the main injections, pilot injections, and after-injections from the respective injectors 40, and the pressure of the high-pressure fuel in the common rail 42 (rail pressure).

The example embodiment described above provides the following advantages.

(First Advantage) In the case the EGR valve 36 is temporarily stuck up at the full-close position, the execution region of the exhaust gas temperature increasing control for the filter recovery process is set to the first control instead of the second control in the region in which the second control is normally executed (region B in FIG. 2), and therefore the exhaust gas temperature is increased through the first control. Thus, the second control is not executed when the EGR valve 36 is temporarily stuck up at the full-close position, and this minimizes the possibility of the problem that, when performing the filter recovery process, the second control is executed despite that the EGR valve 36 is stuck up at the full-close position, resulting in the exhaust gas temperature increasing control failing to increase the exhaust gas temperature as required to accomplish the filter recovery process.

Figure 2:
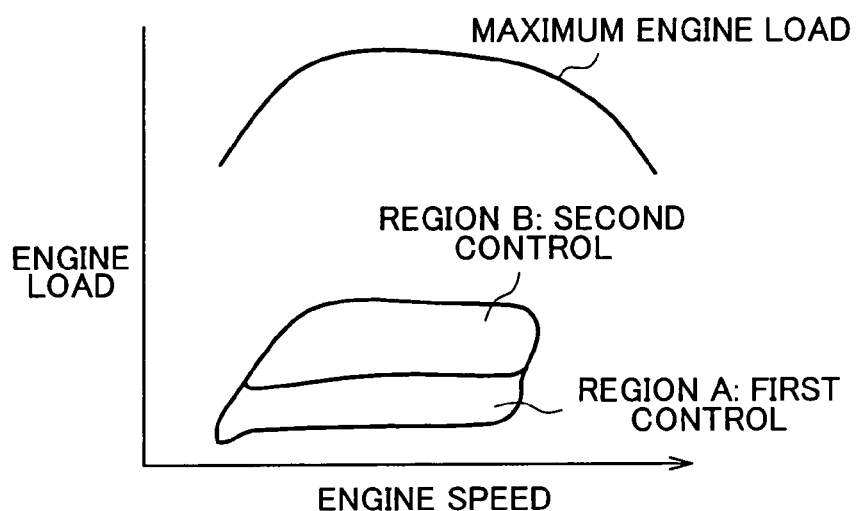
FIG. 2 is a chart illustrating the execution regions for the first control and the second control in the entire operation region of the internal combustion engine.

(Second Advantage) In the case where the EGR valve 36 is not temporarily stuck up at the full-close position, the exhaust gas temperature increasing control increases the exhaust gas temperature by opening the EGR valve 36 by a larger degree than the normal state in the region B shown in FIG. 2. As such, it is possible to reduce the NOx emissions, as well as recovering the filter capacity.

(Third Advantage) When the EGR valve 36 has been released from the temporarily sticking state, the execution regions for the first control and the second control that have been changed (refer to FIG. 3) are changed back to the normal execution regions (refer to FIG. 2). That is, the execution regions for the first control and the second control are changed only when the EGR valve 36 is temporarily stuck up, and therefore the negative effects of the change of the execution regions can be minimized. One of the negative effects is as follows. Because the EGR valve 36 is maintained fully closed also in the region B during the exhaust gas temperature increasing control if the execution regions are changed as described above, the recirculation of exhaust gas through the EGR system is not performed in the region B, and therefore the effect of reducing the NOx emissions of the internal combustion engine 10 is lessened accordingly.

(Fourth Advantage) In order to maintain a sufficient particulate matter trapping capacity of the PM filter 26 by avoiding abnormalities of the PM filter 26 that may occur when an excessive amount of particulate matter is accumulated in the PM filter 26, the filter recovery process is preferably executed as much as possible even when the EGR valve 36 is temporarily stuck up at the full-close position. Thus, when the EGR valve 36 is temporarily stuck up at the full-close position, by changing the execution regions for the first control and the second control as described above in connection with the first advantage, the exhaust gas temperature can be increased, through the exhaust gas temperature increasing control, as required to accomplish the filter recovery process. As such, even in the case where the EGR valve 36 is temporarily stuck up at the full-close position, the filter recovery process can be properly executed, and abnormalities of the PM filter 26 that may otherwise occur due to excessive accumulation of particulate matter in the PM filter 26 can be avoided, and thus a sufficient particulate matter trapping capacity of the PM filter 26 can be maintained.

Figure 3:
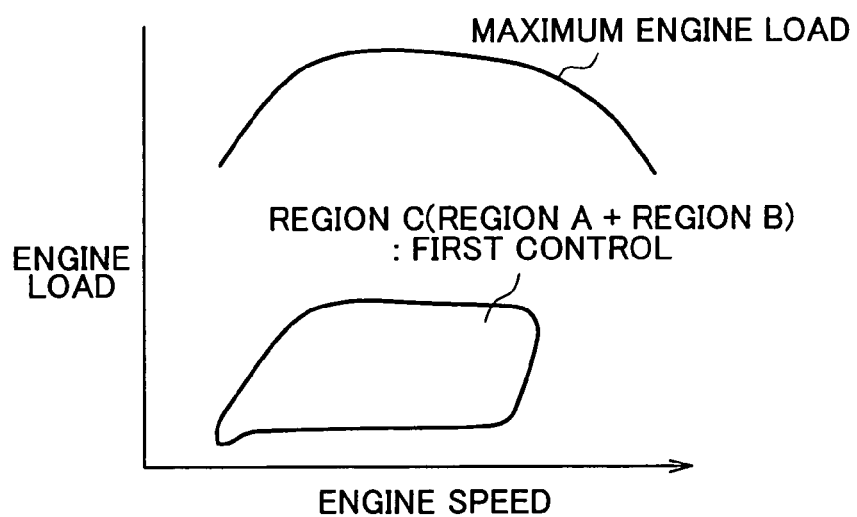
FIG. 3 is a chart illustrating the execution region for the first control that has been changed in response to a temporary sticking of the EGR valve.

(Fifth Advantage) In the case where the execution region for the first control has been made to the region C shown in FIG. 3 by being extended toward the execution region for the second control in response to a temporary sticking of the EGR valve 36, in the extended portion of the region C that corresponds to the region B in FIG. 2, the above-described control of the opening degree of the intake throttle valve 19 and the after-injections are executed such that the exhaust gas temperature is increased more than it is during the second control. Therefore, the exhaust gas temperature can be certainly increased in the extended portion of the execution region for the first control without opening the EGR valve 36 by a larger degree than the normal state.

The exhaust gas purification apparatus of the foregoing example embodiment may be modified as follows.

(a) The execution regions for the first control and the second control are not necessarily changed back to the normal execution regions when the EGR valve 36 is released from a temporarily sticking state.

(b) The exhaust gas purification apparatus of the foregoing example embodiment may be such that the region in which the second control is normally executed is not made an execution region for the first control when a temporary sticking of the EGR valve 36 occurs. For example, only a low-engine-load-side portion of the region in which the second control is normally executed may be changed to an execution region for the first control. In this case, when a temporary sticking of the EGR valve 36 occurs, even though the execution region for the first control is extended toward the execution region for the second control, the second control is still executed in a high engine-load-side portion of the region in which the second control is normally executed. By thus changing the execution regions for the first control and the second control, the second control can be prevented from being executed when the EGR valve 36 is temporarily stuck up at the full-close position, and this minimizes the possibility that the exhaust gas temperature control fail to properly increase the exhaust gas temperature due to the second control being executed despite that the EGR valve 36 is temporarily stuck up at the full-close position.

Figure 6:
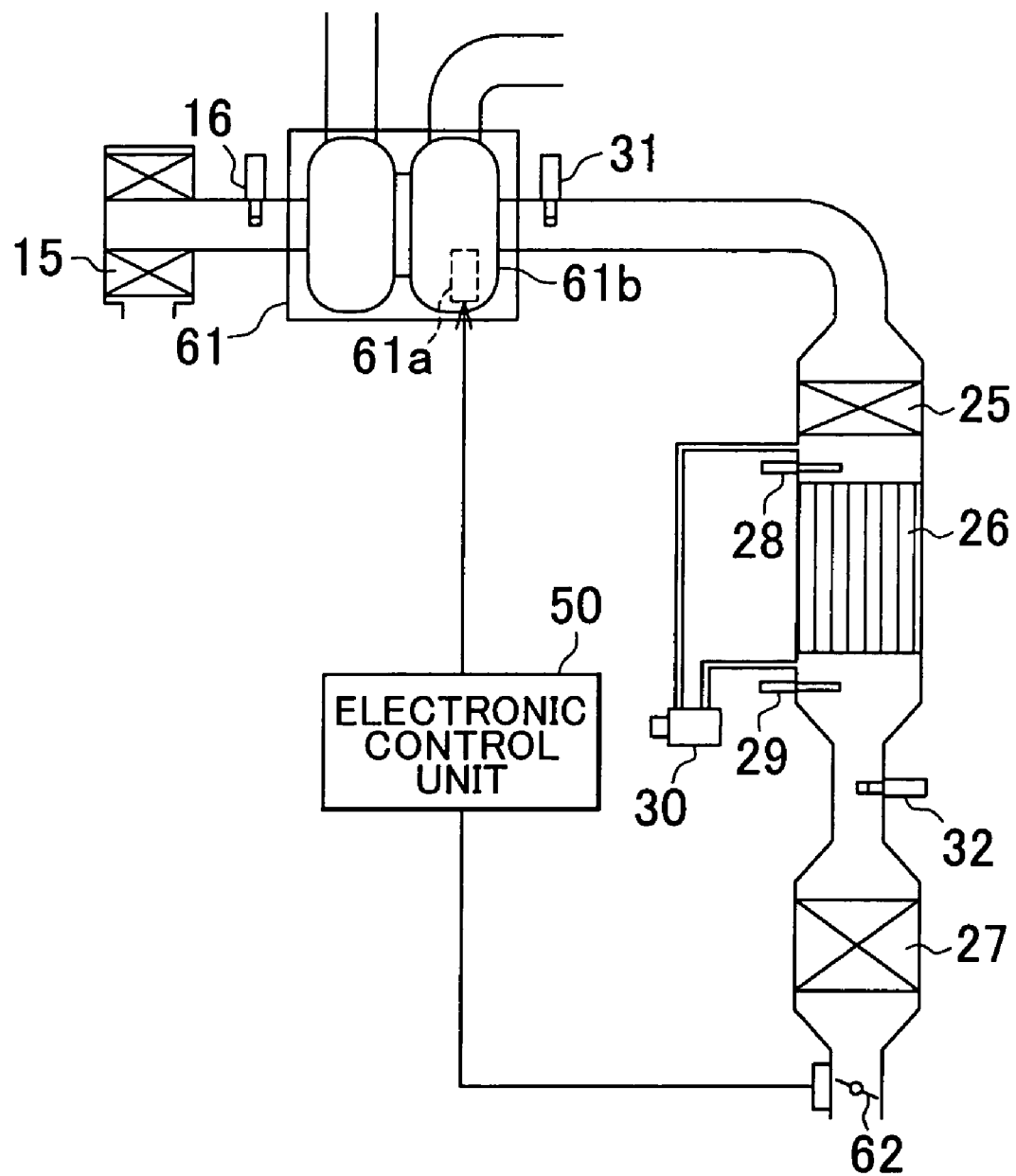
FIG. 6 is a view schematically showing an example in which a variable-capacity turbocharger and an exhaust throttle valve are provided in the exhaust system of an internal combustion engine.

(c) In the case where a variable-capacity turbocharger 61 and an exhaust throttle valve 62 are provided in the exhaust system of the internal combustion engine 10 as shown in FIG. 6, the exhaust gas purification apparatus of the foregoing example embodiment may be such that the exhaust gas temperature increasing control is executed to increase the exhaust gas temperature by controlling the capacity of the variable-capacity turbocharger 61 and opening the exhaust throttle valve 62 by a smaller degree than the normal state. Note that the capacity of the variable-capacity turbocharger 61 can be controlled through the control for making the opening degree of a variable nozzle 61a provided at an exhaust turbine 61b smaller than the normal state. The reason why the exhaust gas temperature can be increased by such control of the opening degrees of the variable nozzle 61a and the exhaust throttle valve 62 is the same as the aforementioned reason why the exhaust gas temperature can be increased by opening the intake throttle valve 19 by a smaller degree than the normal state. Note that such controls of the opening degrees of the variable nozzle 61a and the exhaust throttle valve 62 are executed by the electronic control unit 50.

(d) While the exhaust gas purification apparatus of the foregoing example embodiment has been applied to the exhaust gas temperature increasing control for the filter recovery process, it may alternatively be applied to, for example, the NOx reduction process or the sulfur-poisoning recovery process for the NOx catalysts. In this case, the EGR valve 36 is not necessarily used as the movable-part-equipped movable component to increase the exhaust gas temperature, and the movable-part-equipped movable component may instead be, for example, the intake throttle valve 19, the variable nozzle 61a of the variable-capacity turbocharger 61, or the exhaust throttle valve 62.

(e) While the PM filter 26 of the foregoing example embodiment carries NOx catalyst, a PM filter carrying no NOx catalyst may alternatively be used.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. An exhaust gas purification apparatus for an internal combustion engine having a movable component that is operated during operation of the internal combustion engine, the operation of the movable component causing the temperature of exhaust gas of the internal combustion engine to change, the exhaust gas purification apparatus being adapted to execute an exhaust gas temperature increasing control for increasing the temperature of exhaust gas of the internal combustion engine during a process for recovering the purification capacity of an exhaust gas purification device, the exhaust gas purification apparatus comprising:

a switching portion that, based on an engine operation region, switches the exhaust gas temperature increasing control between a first control in which the temperature of exhaust gas is increased without operating the movable component and a second control in which the temperature of exhaust gas is increased by operating the movable component;

a detecting portion that detects a temporarily sticking state of the movable component; and a controlling portion that, when the temporarily sticking state of the movable component is detected, increases an execution region of the engine operation region for the first control toward an execution region of the engine operation region for the second control in an entire operation region of the internal combustion engine, whereby the execution region for the second control is reduced.

2. The exhaust gas purification apparatus according to claim 1, wherein
when the movable component is in the temporarily sticking state, the controlling portion changes the execution region for the second control entirely to the execution region for the first control.

3. The exhaust gas purification apparatus according to claim 1, wherein
when the movable component is released from the temporarily sticking state, the controlling portion changes the execution regions for the first control and the second control back to the execution regions used when the movable component is not in the temporarily sticking state.

4. The exhaust gas purification apparatus according to claim 1, wherein
when the movable component is released from the temporarily sticking state, the controlling portion extends the execution region for the second control toward the execution region for the first control, whereby the execution region for the first control is reduced.

5. The exhaust gas purification apparatus according to claim 1, wherein
the movable component is at least one of an intake throttle valve, an EGR valve, and a variable nozzle of a variable-capacity turbocharger.

6. The exhaust gas purification apparatus according to claim 1, wherein
the exhaust gas temperature increasing control includes at least one of: a control of an opening degree of an intake throttle valve; a control of an opening degree of an exhaust throttle valve; execution of an after-injection that is performed after a main injection to a combustion chamber; a control of fuel injection amounts and fuel injection timings to the combustion chamber of the main injection, a pilot injection, and the after-injection; a control of pressure of high-pressure fuel in a common rail; and a control of a capacity of a variable-capacity turbocharger, and
when the execution region for the first control is increased, in the increased portion of the execution region for the first control, one or more of the control of: the opening degree of the intake throttle valve; the control of the opening degree of the exhaust throttle valve; execution of the after-injection; the control of the fuel injection amounts and the fuel injection timings to the combustion chamber of the main injection, the pilot injection, and the after-injection; the control of pressure of the high-pressure fuel in the common rail; and the control of the capacity of the variable-capacity turbocharger, which are also performed in the second control, are performed such that the exhaust gas temperature is increased more than it is during the second control.

7. The exhaust gas purification apparatus according to claim 1, wherein
the movable component is at least one of an intake throttle valve, an EGR valve, a variable nozzle of a variable-capacity turbocharger, and an exhaust throttle valve, and
the exhaust gas temperature increasing control is executed to perform a NOx reduction process or a sulfur-poisoning recovery process for a NOx catalyst provided in the exhaust system of the internal combustion engine.

8. The exhaust gas purification apparatus according to claim 1, wherein
the movable component is an EGR valve,
the exhaust gas temperature increasing control is executed so as to burn and thus remove particulate matter accumulated in a filter that is provided in the exhaust system of the internal combustion engine to trap particulate matter, and
when the EGR valve is not in the temporarily sticking state, the switching portion sets the exhaust gas temperature increasing control, in a low engine load region, to the first control in which the temperature of exhaust gas is increased while maintaining the EGR valve fully closed, and sets the exhaust gas temperature increasing control, in an engine load region on a high engine load side of the low engine load region, to the second control in which the temperature of exhaust gas is increased by opening the EGR valve by a larger degree than a normal state.

9. The exhaust gas purification apparatus according to claim 8, wherein
the filter for trapping particulate matter carries a NOx catalyst.

10. The exhaust gas purification apparatus according to claim 8, wherein
the exhaust gas temperature increasing control includes at least one of: a control of an opening degree of an intake throttle valve; a control of an opening degree of an exhaust throttle valve; execution of an after-injection that is performed after a main injection to a combustion chamber; a control of fuel injection amounts and fuel injection timings to the combustion chamber of the main injection, a pilot injection, and the after-injection; a control of pressure of high-pressure fuel in a common rail; and a control of a capacity of a variable-capacity turbocharger, and
when the execution region for the first control is increased, in the increased portion of the execution region for the first control, one or more of: the control of the opening degree of the intake throttle valve; the control of the opening degree of the exhaust throttle valve; execution of the after-injection; the control of the fuel injection amounts and the fuel injection timings to the combustion chamber of the main injection, the pilot injection, and the after-injection; the control of pressure of the high-pressure fuel in the common rail; and the control of a capacity of the variable-capacity turbocharger, which are also performed in the second control, are performed such that the exhaust gas temperature is increased more than it is during the second control.

11. An exhaust gas purification apparatus for an internal combustion engine having a movable component that is operated during operation of the internal combustion engine, the operation of the movable component causing the temperature of exhaust gas of the internal combustion engine to change, the exhaust gas purification apparatus being adapted to execute an exhaust gas temperature increasing control for increasing the temperature of exhaust gas of the internal combustion engine during a process for recovering the purification capacity of an exhaust gas purification device, the exhaust gas purification apparatus comprising:
switching means for switching, based on an engine operation region, the exhaust gas temperature increasing control between a first control in which the temperature of exhaust gas is increased without operating the movable component and a second control in which the temperature of exhaust gas is increased operating the movable component;

detecting means for detecting a temporarily sticking state of the movable component; and controlling means for increasing, when the temporarily sticking state of the movable component is detected, an execution region of the engine operation region for the first control toward an execution region of the engine operation region for the second control in an entire operation region of the internal combustion engine, whereby the execution region for the second control is reduced.

12. An exhaust gas purification method for an internal combustion engine having a movable component that is operated during operation of the internal combustion engine, the operation of the movable component causing the temperature of exhaust gas of the internal combustion engine to change, wherein an exhaust gas temperature increasing control for increasing the temperature of exhaust gas of the internal combustion engine is executed during a process for recovering the purification capacity of an exhaust gas purification device, the exhaust gas purification method comprising:

switching, based on an engine operation region, the exhaust gas temperature increasing control between a first control in which the temperature of exhaust gas is increased without operating the movable component and a second control in which the temperature of exhaust gas is increased operating the movable component;

detecting a temporarily sticking state of the movable component; and increasing, when the temporarily sticking state of the movable component is detected, an execution region of the engine operation region for the first control toward an execution region of the engine operation region for the second control in an entire operation region of the internal combustion engine, whereby the execution region for the second control is reduced.

* * * * *